(12) United States Patent
Tsai et al.

(10) Patent No.: US 11,117,264 B2
(45) Date of Patent: Sep. 14, 2021

(54) ROBOTIC SYSTEM

(71) Applicant: Quanta Computer Inc., Taoyuan (TW)

(72) Inventors: Sheng-An Tsai, Taoyuan (TW);
Lu-Lung Tsao, Taoyuan (TW);
Yu-Ching Tsai, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 325 days.

(21) Appl. No.: 16/166,271

(22) Filed: Oct. 22, 2018

(65) Prior Publication Data

US 2020/0001467 A1  Jan. 2, 2020

(30) Foreign Application Priority Data

Jun. 28, 2018  (TW) .................... 107122387

(51) Int. Cl.
| | | |
|---|---|---|
| *B25J 11/00* | (2006.01) | |
| *B25J 9/16* | (2006.01) | |
| *B25J 9/00* | (2006.01) | |
| *A47L 9/00* | (2006.01) | |
| *A47L 11/24* | (2006.01) | |
| *A47L 7/00* | (2006.01) | |
| *B25J 5/00* | (2006.01) | |
| *A47L 11/40* | (2006.01) | |

(52) U.S. Cl.
CPC ........... *B25J 11/0085* (2013.01); *B25J 5/007* (2013.01); *B25J 9/0009* (2013.01); *B25J 9/1694* (2013.01); *A47L 7/0085* (2013.01); *A47L 9/0063* (2013.01); *A47L 11/24* (2013.01); *A47L 11/4011* (2013.01); *A47L 2201/02* (2013.01)

(58) Field of Classification Search
CPC ...... B25J 11/0085; B25J 5/007; B25J 9/0009; B25J 9/1694; A47L 7/0085; A47L 9/0063; A47L 11/24; A47L 11/4011; A47L 2201/02
See application file for complete search history.

(56) References Cited

U.S. PATENT DOCUMENTS

| | | | |
|---|---|---|---|
| 8,106,626 B2* | 1/2012 | Li | B60L 53/30 320/109 |
| 2016/0088755 A1* | 3/2016 | Lee | B25J 13/006 361/731 |
| 2016/0183752 A1* | 6/2016 | Morin | A47L 9/1666 134/18 |
| 2016/0227975 A1* | 8/2016 | Ebrahimi Afrouzi | A47L 11/4066 |
| 2016/0334801 A1* | 11/2016 | Ratanaphanyarat | B25J 5/007 |

(Continued)

FOREIGN PATENT DOCUMENTS

| | | |
|---|---|---|
| CN | 104132412 A | 11/2014 |
| CN | 104493819 A | 4/2015 |

(Continued)

*Primary Examiner* — Jeff A Burke
*Assistant Examiner* — Joshua Alexander Garza

(57) ABSTRACT

A robotic system includes a docking station, a mobile working machine, and an electronic device. The mobile working machine includes a machine body and a transmission wheel device disposed on the machine body for loading and moving the machine body. The electronic device is detachably connected to the mobile working machine. The docking station includes a station base and a transferring device disposed on the station base for selectively carrying the electronic device away from the mobile working machine.

9 Claims, 8 Drawing Sheets

(56) References Cited

U.S. PATENT DOCUMENTS

| | | | |
|---|---|---|---|
| 2017/0038772 A1* | 2/2017 | Ratanaphanyarat | B60L 3/0015 |
| 2017/0079498 A1 | 3/2017 | Kim et al. | |
| 2019/0248007 A1* | 8/2019 | Duffy | B25J 9/08 |
| 2020/0275815 A1* | 9/2020 | Furuta | A47L 9/0063 |

FOREIGN PATENT DOCUMENTS

| | | |
|---|---|---|
| CN | 105433878 A | 3/2016 |
| CN | 106264335 A | 1/2017 |
| CN | 206633023 U | 11/2017 |
| TW | M493970 U | 1/2015 |

\* cited by examiner

ROBOTIC SYSTEM

RELATED APPLICATIONS

This application claims priority to Taiwan Application Serial Number 107122387, filed Jun. 28, 2018, which is herein incorporated by reference.

BACKGROUND

Field of Disclosure

The disclosure relates to a robotic system. More particularly, the disclosure relates to a robotic system having an electronic device and a detachable base which are detachable to each other.

Description of Related Art

With the development of science technology, a vacuum sweeping machine is provided in the industry to automatically move around and clean by itself so as to reduce the chance of clean work by human. After cleaning, the vacuum sweeping machine can automatically return to a docking station for charging and parking.

However, in order to enable the vacuum sweeping machine to have more functional or high-end performance, circuit modules and power supply architecture which are higher-level and complexed must be added into a main machine of the vacuum sweeping machine, so that the main machine of the vacuum sweeping machine may be eventually developed to a machine with a thicker appearance which have restrictions of cumbersome, inflexible, and high power consumption.

SUMMARY

In one embodiment of the disclosure, a robotic system is provided. The robotic system includes a mobile working machine, an electronic device and a docking station. The mobile working machine includes a machine body and a transmission wheel device disposed on the machine body for loading and moving the machine body. The electronic device is detachably connected to the mobile working machine. The docking station includes a station base and a transferring device disposed on the station base for selectively carrying the electronic device away from the mobile working machine.

According to one or more embodiments of the disclosure, in the robotic system, the transferring device includes at least one cantilever arm and a transmission module. The transmission module is collectively moved with the at least one cantilever arm, and the cantilever arm is elevatably disposed on one side of the station base for lifting the electronic device upwardly from the mobile working machine.

According to one or more embodiments of the disclosure, in the robotic system, the electronic device includes a casing and an electronic module. The electronic module is disposed within the casing, and one side of the casing is formed with a recess. Thus, when the cantilever arm extends into the recess, the transferring device drives the cantilever arm to push the electronic device upwardly within the recess.

According to one or more embodiments of the disclosure, in the robotic system, the casing is provided with a positioning post. The positioning post is disposed within the recess, and connected to an inner surface of the recess. One surface of the cantilever arm is formed with a positioning opening. Thus, when the cantilever arm pushes the electronic device upwardly within the recess, the positioning post is matchingly engaged within the positioning opening.

According to one or more embodiments of the disclosure, in the robotic system, the side of the casing is provided with a first resisting portion, and the side of the station base is provided with a second resisting portion. Thus, when the transferring device lifts the electronic device upwardly from the mobile working machine, the first resisting portion is slidably abutted against the second resisting portion. The first resisting portion is a planar surface, a convex arc surface or a rotation wheel.

According to one or more embodiments of the disclosure, in the robotic system, the electronic device includes a casing and an electronic module. The electronic module is disposed within the casing. The casing is provided with two protruding wings. The protruding wings are respectively disposed on two opposite sides of the casing, and the cantilever arm includes two cantilever arms. Thus, when the cantilever arms move to the below of the two protruding wings, respectively, the transferring device drives the cantilever arms to push the electronic device upwardly.

According to one or more embodiments of the disclosure, in the robotic system, the station base is formed with a concave portion. The concave portion is formed with a guiding inner wall. The guiding inner wall is configured to guide the mobile working machine to correctly move such that the cantilever arm is in a position ready to lift the electronic device up.

According to one or more embodiments of the disclosure, in the robotic system, the mobile working machine further includes two rotation wheels. The rotation wheels are arranged oppositely on the machine body, and configured to directly roll on the guiding inner wall, respectively.

According to one or more embodiments of the disclosure, in the robotic system, the mobile working machine includes a first control element and a first sensing element. The first control element is electrically connected to the first sensing element and the transmission wheel device. The docking station includes a second control element and a second sensing element. The second control element is electrically connected to the transferring device and the second sensing element. Thus, when the mobile working machine loading the electronic device is coupled with the docking station, and the second sensing element is sensed by the first sensing element, the second control element drives the transferring device to carry the electronic device away from the mobile working machine. On the other hand, when the mobile working machine without loading the electronic device is coupled with the docking station, and the second sensing element is sensed by the first sensing element, the second control element drives the transferring device to carry the electronic device back onto the mobile working machine.

According to one or more embodiments of the disclosure, in the robotic system, the electronic device is a smart home manager device, a multimedia player, a security monitoring device, a smart secretary device or an air cleaner.

Thus, through the construction of the embodiments above, when the electronic device which is able to professionally work is not required, the electronic device can be selectively detached from the mobile working machine to be placed securely on the docking station. Thus, the mobile working machine can temporarily work alone without the electronic device.

The above description is merely used for illustrating the problems to be resolved, the technical methods for resolving the problems and their efficacies, etc. The specific details of the disclosure will be explained in the embodiments below and related drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1:
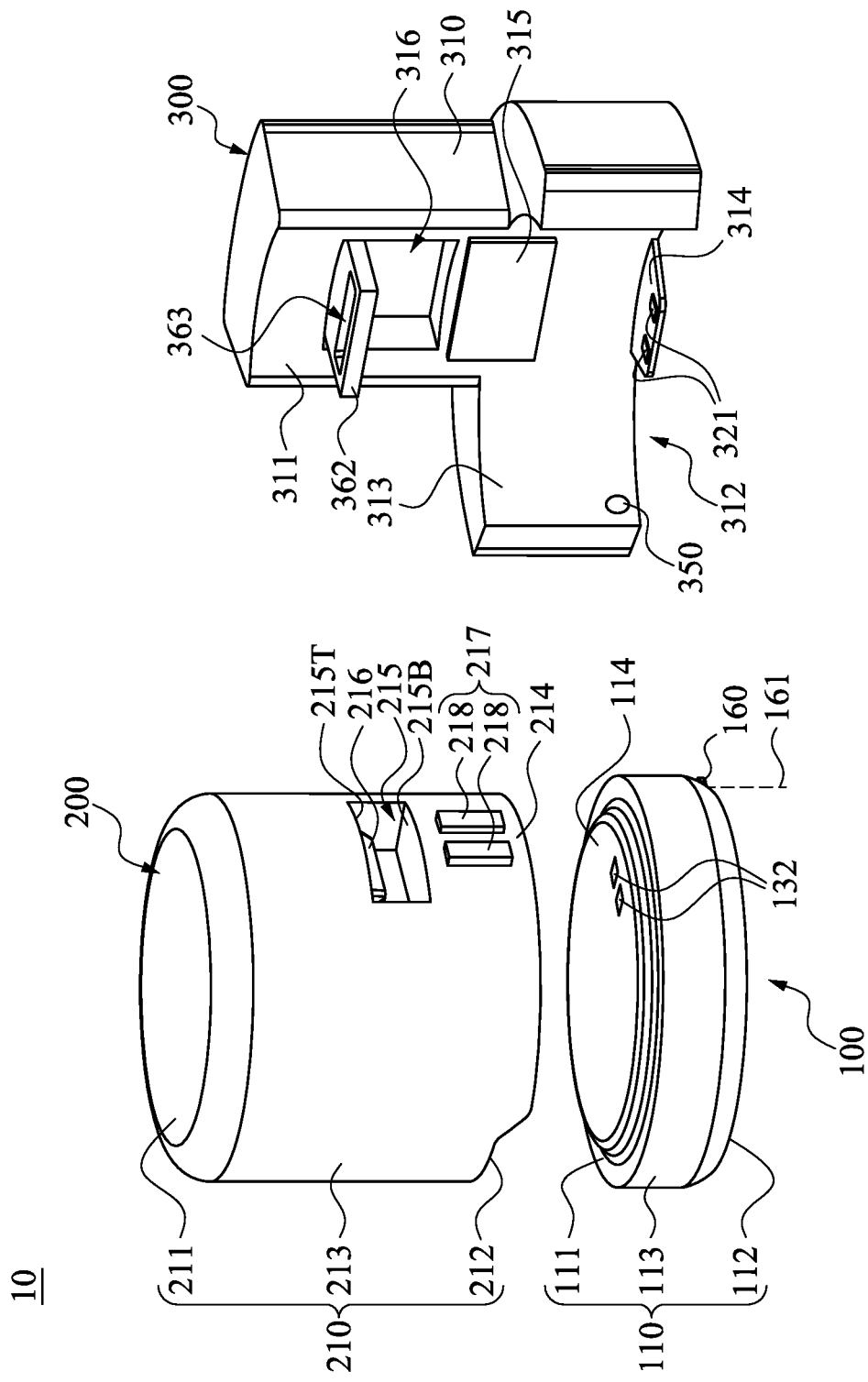
FIG. 1 is a disassembled view of a mobile working machine of a robotic system that has not docked to a docking station yet according to one embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
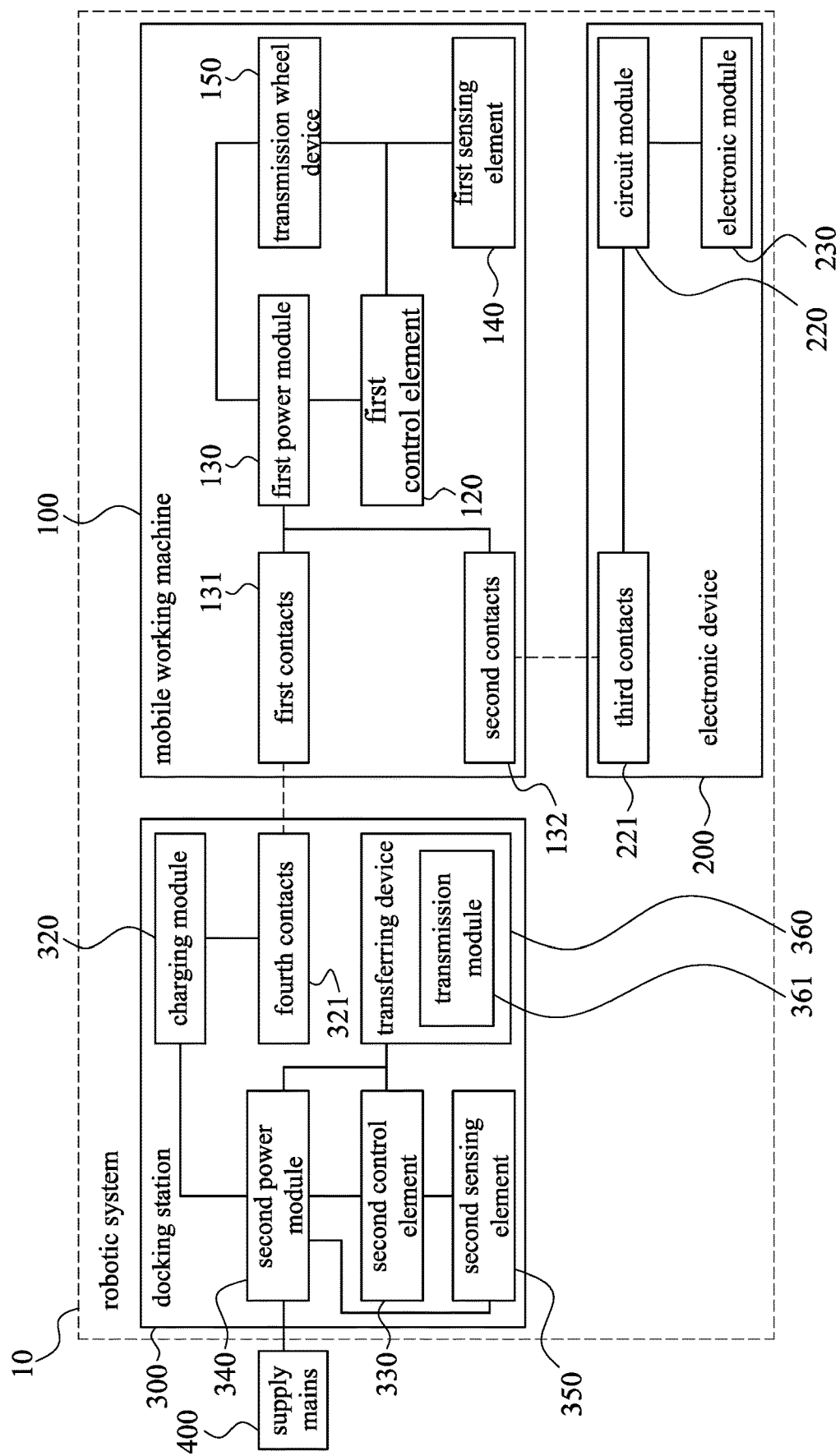
FIG. 2 is an electronic block diagram of the robotic system of FIG. 1.
Figure 3:
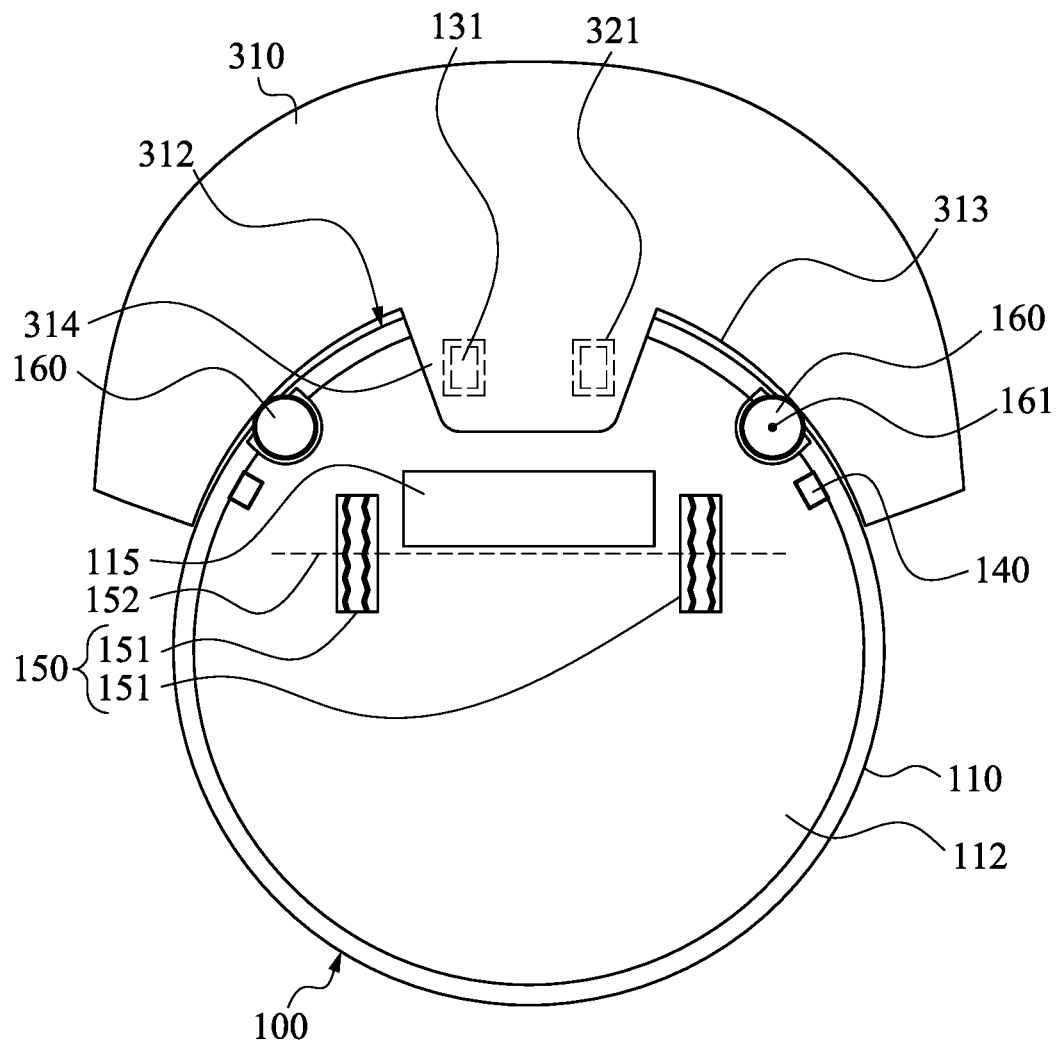
FIG. 3 is a bottom view of the mobile working machine of FIG. 1.

Reference is now made to FIG. 1 to FIG. 3, in which FIG. 1 is a disassembled view of a mobile working machine 100 of a robotic system 10 that has not docked to a docking station 300 yet according to one embodiment of the disclosure, FIG. 2 is an electronic block diagram of the robotic system 10 of FIG. 1, and FIG. 3 is a bottom view of the mobile working machine 100 of FIG. 1. The robotic system 10 includes a mobile working machine 100, an electronic device 200 and a docking station 300. The mobile working machine 100 includes a machine body 110 and a transmission wheel device 150. The transmission wheel device 150 is disposed on the machine body 110 for loading and moving the machine body 110. The electronic device 200 is detachably connected to the mobile working machine 100. The docking station 300 includes a station base 310 and a transferring device 360. The transferring device 360 is disposed on the station base 310, and used to selectively lift up an object or put the object down. For example, when the mobile working machine 100 loading the electronic device 200 is coupled with the docking station 300, the transferring device 360 of the docking station 300 lifts up the electronic device 200 from the mobile working machine 100, so that the electronic device 200 and mobile working machine 100 can be completely separated to each other.

Specifically, the mobile working machine 100 includes a first control element 120, a first power module 130 and a first sensing element 140. The first control element 120, the first power module 130, the first sensing element 140 and the transmission wheel device 150 are respectively disposed on the machine body 110. The first power module 130 is electrically connected to the first control element 120, the first sensing element 140 and the transmission wheel device 150, and is used to provide required supply power to the first control element 120, the first sensing element 140 and the transmission wheel device 150. For example, the first control element 120 is disposed in the machine body 110, and is electrically connected to the first sensing element 140 and the transmission wheel device 150. The machine body 110 includes a top surface 111, a bottom surface 112 and at least one periphery surface 113. The top surface 111 is opposite to the bottom surface 112. The periphery surface 113 surrounds the top surface 111 and the bottom surface 112, and adjoins the top surface 111 and the bottom surface 112, respectively. The first power module 130 includes an arrangement circuit (not shown in figures), one or more (e.g., two) first contacts 131, and one or more (e.g., two) second contacts 132. The arrangement circuit of the first power module 130 is arranged in the machine body 110. The first contacts 131 are located at the bottom surface 112 of the machine body 110, electrically connected to the arrangement circuit, and exposed outwards from an outer surface of the machine body 110. The second contacts 132 are located at the top surface 111 of the machine body 110, electrically connected to the arrangement circuit, and exposed outwards from an outer surface of the machine body 110. The transmission wheel device 150 is installed at the bottom surface 112 of the machine body 110 for loading and moving the machine body 110 on a ground surface, for example, for moving the machine body 110 towards a front side 311 of the docking station 300.

The electronic device 200 further includes a casing 210, a circuit module 220 and an electronic module 230. The casing 210 includes a top surface 211, a bottom surface 212 and at least one periphery surface 213. The top surface 211 is opposite to the bottom surface 212. The periphery surface 213 surrounds the top surface 211 and the bottom surface 212, and adjoins the top surface 211 and the bottom surface 212, respectively. The circuit module 220 and the electronic module 230 are installed inside the casing 210, and the circuit module 220 is electrically connected to the electronic module 230. The circuit module 220 includes one or more (e.g., two) third contacts 221. The third contacts 221 are located at the bottom surface 212 of the casing 210, and exposed outwards from an outer surface of the casing 210 (not shown). More particularly, when the electronic device 200 is placed above the mobile working machine 100, the bottom surface 212 of the casing 210 of the electronic device 200 is contacted with the top surface 111 of the machine body 110 of the mobile working machine 100 so that the electronic device 200 can work at an unspecified position, or be moved to the front side 311 of the docking station 300 through the transportation of the mobile working machine 100. It is to be noted, the electronic module 230 of the electronic device 200 can be generally referred to any of specialized working modules. Exemplarily, the electronic module 230 is a smart home device, a multimedia player, a security monitoring device, a smart secretary device or an air cleaner, which are known in the market.

Furthermore, when the electronic device 200 is placed above the mobile working machine 100, the third contacts 221 of the electronic device 200 are directly contacted with the second contacts 132 of the mobile working machine 100 so that the electronic device 200 and the mobile working machine 100 are able to exchange signals with each other.

Specifically, the first power module 130 provides required supply power to the electronic module 230 through the third contacts 221 and the second contacts 132 being contacted with each other. The first control element 120 electrically controls the electronic module 230 to work through the third contacts 221 and the second contacts 132 being contacted with each other. However, the disclosure is not limited thereto, in another embodiment, as long as the electronic device 200 has an independent power source itself, the electronic device 200 and the mobile working machine 100 can be electrically connected to each other in a wireless manner (such as Bluetooth transmission mode) so that the third contact 221 and the second contact 132 may not be needed by the electronic device 200 and the mobile working machine 100, respectively.

Specifically, the mobile working machine 100 is provided with a first engaging portion 114 at the top surface 111 of the machine body 110 of the mobile working machine 100. The electronic device 200 is provided with a second engaging portion 214 at the bottom surface 212 of the casing 210 of the electronic device 200. The first engaging portion 114 and the second engaging portion 214 are complementarily matched to each other. Therefore, when the electronic device 200 is placed above the mobile working machine 100, the electronic device 200 can be stably jointed to the mobile working machine 100 through the first engaging portion 114 and the second engaging portion 214 which are matchingly engaged with each other.

In the embodiment, the docking station 300 further includes a charging module 320, a second control element 330, a second power module 340 and a second sensing element 350. The transferring device 360, the charging module 320, the second control element 330, the second power module 340 and the second sensing element 350 are respectively disposed on the station base 310, and the second power module 340 is electrically connected to the second control element 330, the second sensing element 350, the charging module 320 and the transferring device 360, and is used to provide required supply power to the second control element 330, the second sensing element 350, the charging module 320 and the transferring device 360. For example, the second control element 330 is disposed in the station base 310, and electrically connected to the charging module 320, the transferring device 360 and the second sensing element 350. For example, the charging module 320 includes a charging circuit (not shown in figures) and one or more (e.g., two) fourth contacts 321. The charging circuit is arranged in the station base 310. The fourth contacts 321 are located at the front side 311 of the docking station 300, electrically connected to the charging circuit, and exposed outwards from an outer surface of the station base 310. Thus, when the mobile working machine 100 arrives at the front side 311 of the docking station 300, such that the first contacts 131 of the mobile working machine 100 can be directly contacted with the fourth contacts 321 of the docking station 300, the charging module 320 can electrically charge the first power module 130 of the mobile working machine 100 through the first contacts 131 and the fourth contacts 321 which are contacted with each other. More particularly, the charging module 320 transmits the supply mains 400 to the mobile working machine 100 via the first contact 131 and the fourth contact 321 that are in contact with each other so as to electrically charge the first power module 130.

In the embodiment, for example but not to be limited in the disclosure, a convex plate 314 is provided on the front side 311 of the docking station 300. The convex plate 314 is connected to the station base 310, and the fourth contacts 321 are exposed outwards from an outer surface of the convex plate 314. Thus, when the mobile working machine 100 arrives at the front side 311 of the docking station 300, the bottom surface 112 of the machine body 110 of the mobile working machine 100 exactly overrides across the convex plate 314 such that the first contacts 131 of the mobile working machine 100 are in direct contact with the fourth contacts 321 of the docking station 300 (FIG. 3). However, in other embodiments, as long as the first contacts 131 can be in direct contact with the fourth contacts 321, the exact positions of the first contacts 131 and the fourth contacts 321 are not limited in the disclosure.

Also, as shown in FIG. 1 and FIG. 2, the transferring device 360 includes a cantilever arm 362 and a transmission module 361. The transmission module 361 is collectively moved with the cantilever arm 362, and is electrically connected to the second control element 330 and the second power module 340. The cantilever arm 362 is elevatably disposed on the station base 310. Specifically, the cantilever arm 362 is elevatably disposed within a sunken portion 316 formed on the front side 311 of the station base 310, and the cantilever arm 362 is able to move upwardly from the mobile working machine, and downwardly onto the mobile working machine. Exemplarily, the transmission module 361 is a motor. However, the disclosure is not limited to the type of the transmission module 361. In another embodiment, the transmission module 361 may also be a cylinder or a solenoid valve.

As shown in FIG. 1 and FIG. 3, the station base 310 is formed with a concave portion 312. The concave portion 312 is located at the front side of the station base 310, and the concave portion 312 is formed with at least one guiding inner wall 313. The guiding inner wall 313 is connected to the convex plate 314 of the docking station 300. The convex plate 314 and the fourth contacts 321 are substantially located at a middle portion of the guiding inner wall 313. Thus, when the mobile working machine 100 moves to the concave portion 312 of the docking station 300, the concave portion 312 is used to receive at least one part of the mobile working machine 100. Therefore, not only the part of the mobile working machine 100 can be shielded and protected, but also the total volume of the mobile working machine 100 and the docking station 300 can be decreased.

Also, when the mobile working machine 100 attempts to move to the docking station 300, through the guidance of the guiding inner wall 313, the mobile working machine 100 is able to correctly and rapidly dock to the desired position in the concave portion 312. When the mobile working machine 100 is in the desired position, the cantilever arm 362 can be ready for lifting the electronic device 200 up exactly. Thus, the success rate of the mobile working machine 100 correctly returning to the docking station 300 can be increased.

In the embodiment, as shown in FIG. 1 and FIG. 3, the mobile working machine 100 further includes two rotation wheels 160. The rotation wheels 160 are arranged oppositely on the machine body 110, and can directly roll on the guiding inner wall 313, respectively. Specifically, each of the rotation wheels 160 is pivotally connected to the bottom surface 112 of the machine body 110, and each of the rotation wheels 160 is provided with a first rotation axis line 161 as an axis vertically penetrating through the drawing paper of FIG. 3, that is, each of the rotation wheels 160 rotates about the first rotation axis line 161. The transmission wheel device 150 includes two wheels 151. The wheels 151 are respectively pivotally connected to the machine body 110, and the wheels 151 are coaxial with each other.

Each of the wheels 151 is provided with a second rotation axis line 152, that is, each of the wheels 151 rotates about the second rotation axis line 152. Thus, when the transmission wheel device 150 of the mobile working machine 100 is put on a ground surface (FIG. 1), each of the first rotation axis lines 161 passes through the ground surface, and the first rotation axis lines 161 of the rotation wheels 160 are parallel with each other. Each of the first rotation axis lines 261 is orthogonal to the second rotation axis line 152 of the wheels 151.

It is to be noted that each of the rotation wheels 160 is an idle rotation wheels, and not driven by electrical power. That is, the rotation wheels 160 may be pushed to rotate with the interference of the guiding inner wall 313. However, the disclosure is not limited thereto, in another embodiment, these rotation wheels 160 can also be modified to be driven to rotate by electrical power, or to be synchronized to rotate with the wheels of the transmission wheel device together.

Figure 4A:
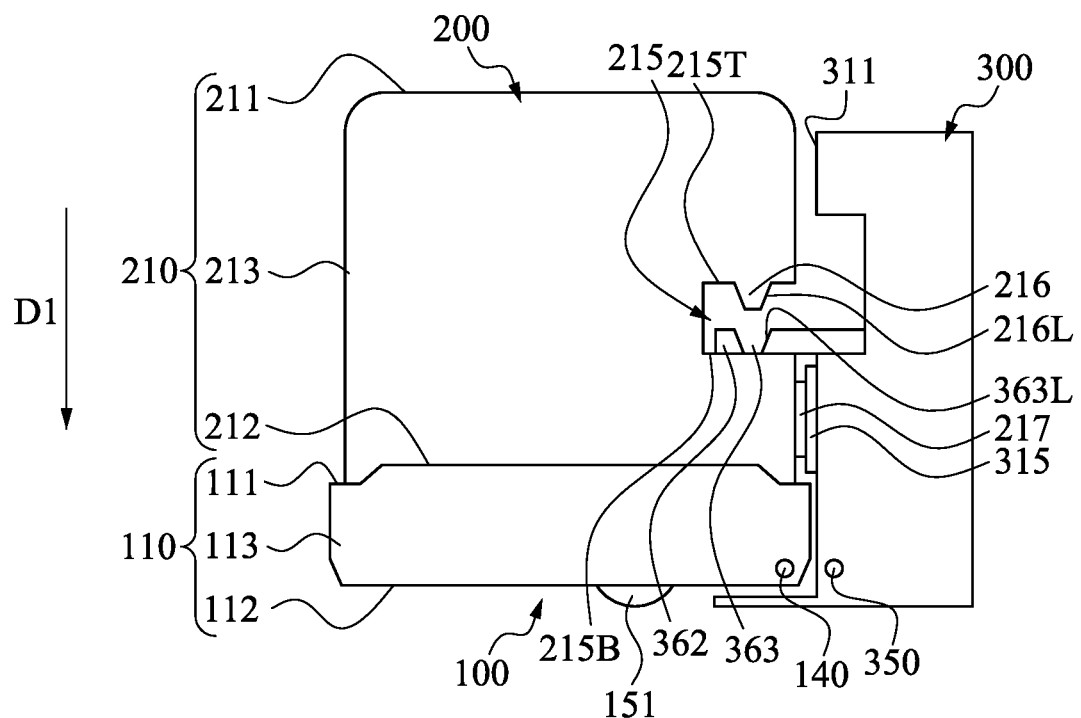
FIG. 4A-FIG. 4D are continuous schematic views that the electronic device of FIG. 1 is removed away from the mobile working machine to the docking station.
Figure 4B:
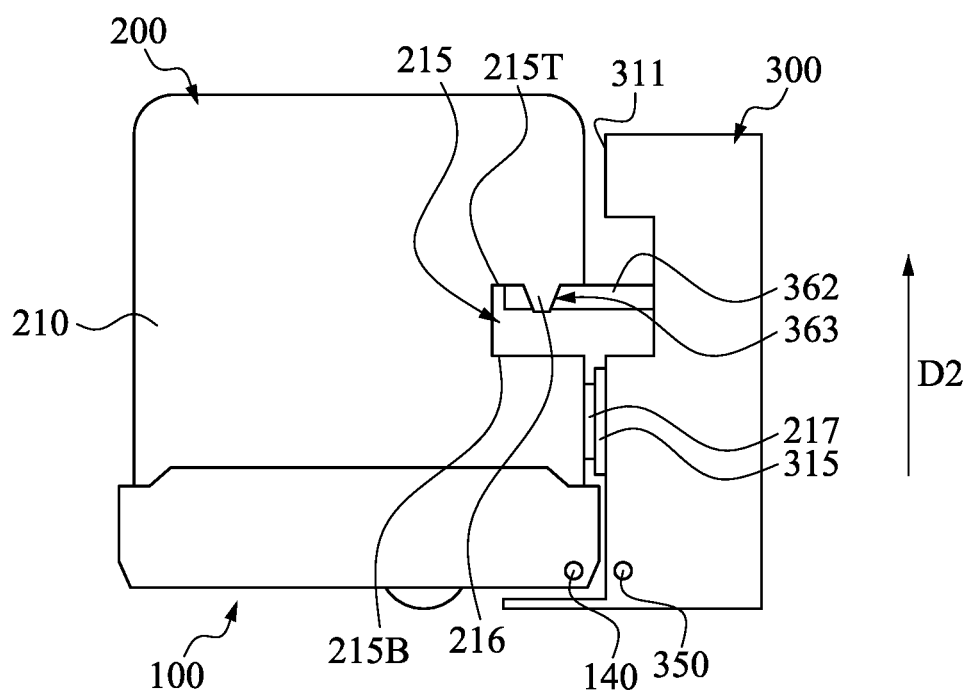
Figure 4C:
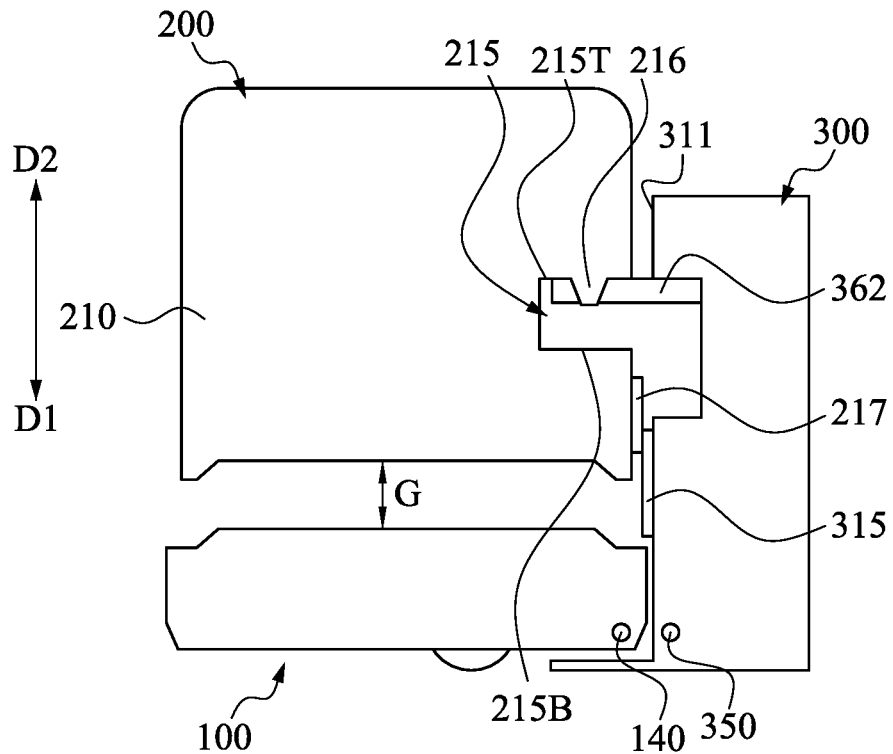
Figure 4D:
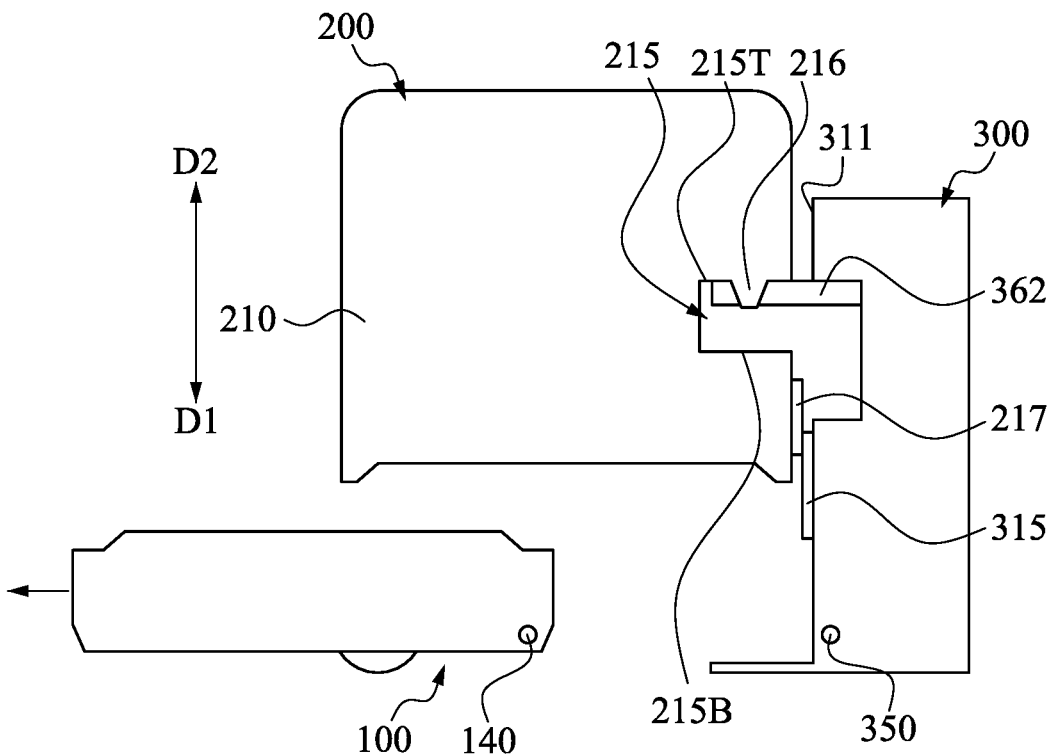

FIG. 4A-FIG. 4D are continuous schematic views that the electronic device 200 of FIG. 1 is removed away from the mobile working machine 100 to the docking station 300. As shown in FIG. 2 and FIG. 4A-Fig. 4C, when the mobile working machine 100 is coupled to the front side 311 of the docking station 300, such that the first sensing element 140 is sensed by the second sensing element 350, accordingly, the second control element 330 is able to drive the transferring device 360 to carry the electronic device 200 away from the mobile working machine 100. As shown in FIG. 4D, since the electronic device 200 is hung on the docking station 300 individually after the electronic device 200 is detached from the mobile working machine 100 by the docking station 300, thus, when the electronic device 200 is not used, the electronic device 200 which can professionally work can be detached from the mobile working machine 100 so that the mobile working machine 100 can temporarily leave the electronic device 200 and the docking station 300.

For example, but not limited in the disclosure, the first sensing element 140 is an illuminator such as an infrared or visible light (e.g., LED). The second sensing element 350 is an optical transceiver such as a reflective infrared transceiver or a visible light transceiver. However, in another embodiment, as long as the first sensing element and the second sensing element are able to be sensed with each other, the exact positions of the first sensing element and the second sensing element are not limited in the disclosure. For example, the first sensing element and the second sensing element may also be embodied in a combination of a trigger button and a push portion; in another embodiment, the first sensing element and the second sensing element may also be embodied in a combination of a magnetic induction element and a magnet; or in another embodiment, the first sensing element and the second sensing element may also be embodied in a combination of electronic components capable of emitting and receiving inductive signals.

As shown in FIG. 1 and FIG. 4A, the one side (e.g., the periphery surface 213) of the casing 210 of the electronic device 200 is formed with a recess 215 and a first resisting portion 217. The recess 215 includes a top inner surface 215T and a bottom inner surface 215B. The first resisting portion 217 is disposed between the recess 215 and the bottom surface 212 of the casing 210. The first resisting portion 217 is closer to the bottom inner surface 215B of the recess 215 than the top inner surface 215T of the recess 215. The first resisting portion 217 includes two cushion pads 218, and each of the cushion pads 218 has a planar surface at one side of the cushion pads 218 opposite to the periphery surface 213 of the casing 210. However, the disclosure is not limited thereto, in another embodiment, each of the planar surfaces also can be modified as a convex arc surface or a rotation wheel instead. Furthermore, the front side 311 of the station base 310 is further provided with a second resisting portion 315. The second resisting portion 315 is disposed between the sunken portion 316 and the fourth contacts 321. The second resisting portion 315 includes a smooth surface, a low friction material, or a device having a roller thereon. However, the disclosure is not limited thereto.

As shown in FIG. 4A, when the mobile working machine 100 loading the electronic device 200 is coupled with the front side 311 of the docking station 300, the recess 215 of the electronic device 200 faces towards the front side 311 of the docking station 300, and the cantilever arm 362 of the transferring device 360 extends into the recess 215. More particularly, the cantilever arm 362 of the transferring device 360 is placed on the bottom inner surface 215B or at least not placed on the top inner surface 215T within the recess 215. The first resisting portion 217 can slidably press against the second resisting portion 315.

Furthermore, as shown in FIG. 1 and FIG. 4A, the casing 210 is provided with a positioning post 216. The positioning post 216 is disposed within the recess 215. The positioning post 216 is connected to the top inner surface 215T of the recess 215, and vertically extends in a direction D1 from the top inner surface 215T towards the bottom inner surface 215B. For example, the direction D1 vertically penetrates through the bottom inner surface 215B from the top inner surface 215T. One surface of the cantilever arm 362 is formed with a positioning opening 363 such as a penetrating hole.

As shown in FIG. 4B, when the cantilever arm 362 is driven to elevate to the top inner surface 215T within the recess 215 along a direction D2, the positioning post 216 is matchingly engaged within the positioning opening 363 exactly. Exemplarily, the direction D2 vertically goes through the top inner surface 215T from the bottom inner surface 215B. More particularly, as shown in FIG. 4A and FIG. 4B, the positioning post 216 includes plural sloped side surfaces 216L, and the positioning opening 363 is provided with plural sloped inner surfaces 363L. When the positioning post 216 inserts into the positioning opening 363, through the sloped side surfaces 216L and the sloped inner surfaces 363L which are matchingly engaged with each other, the positioning post is matchingly engaged within the positioning opening.

As shown in FIG. 4C, when the cantilever arm 362 is driven to continue to elevate within the recess 215 in the direction D2, so as to push the top inner surface 215T within the recess 215 in the direction D2, thus, the cantilever arm 362 removes the electronic device 200 from the mobile working machine 100 in which the electronic device 200 is completely separated from the mobile working machine 100, and the second contacts 132 of the mobile working machine 100 are completely disconnected to the third contacts 221 of the electronic device 200 (FIG. 2). That is, an air gap G is obviously formed between the electronic device 200 and the mobile working machine 100. At the same moment, when the electronic device 200 is lifted by the transferring device 360, the first resisting portion 217 starts to directly slide upwardly in the direction D2 along the second resisting portion 315.

Figure 5A:
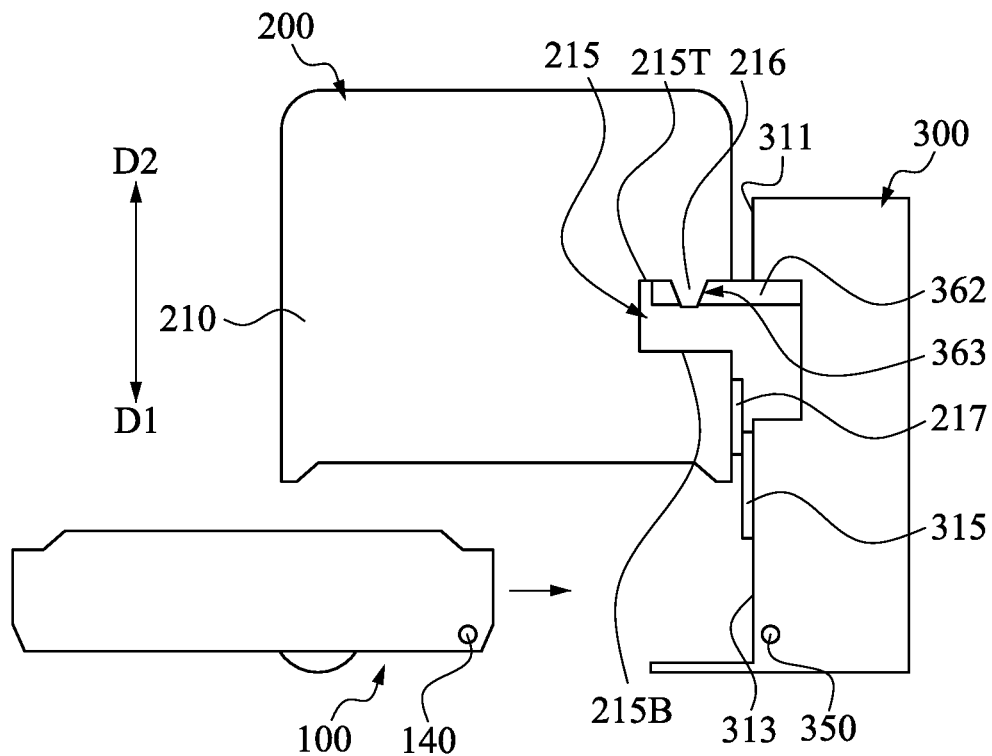
FIG. 5A-FIG. 5C are continuous schematic views that the electronic device of FIG. 1 is placed back to the mobile working machine from the docking station.
Figure 5B:
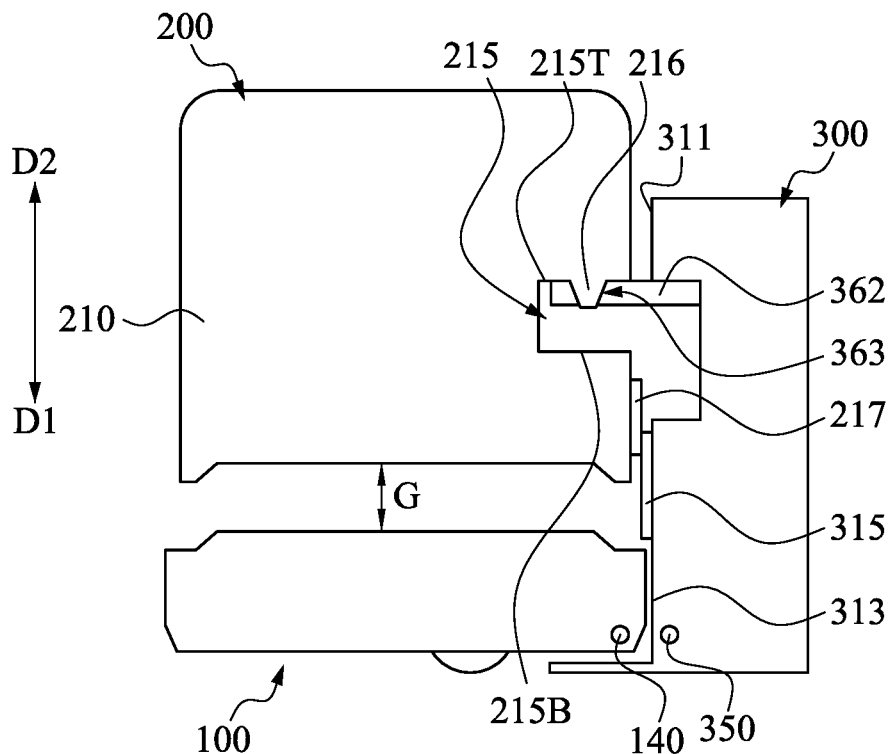
Figure 5C:
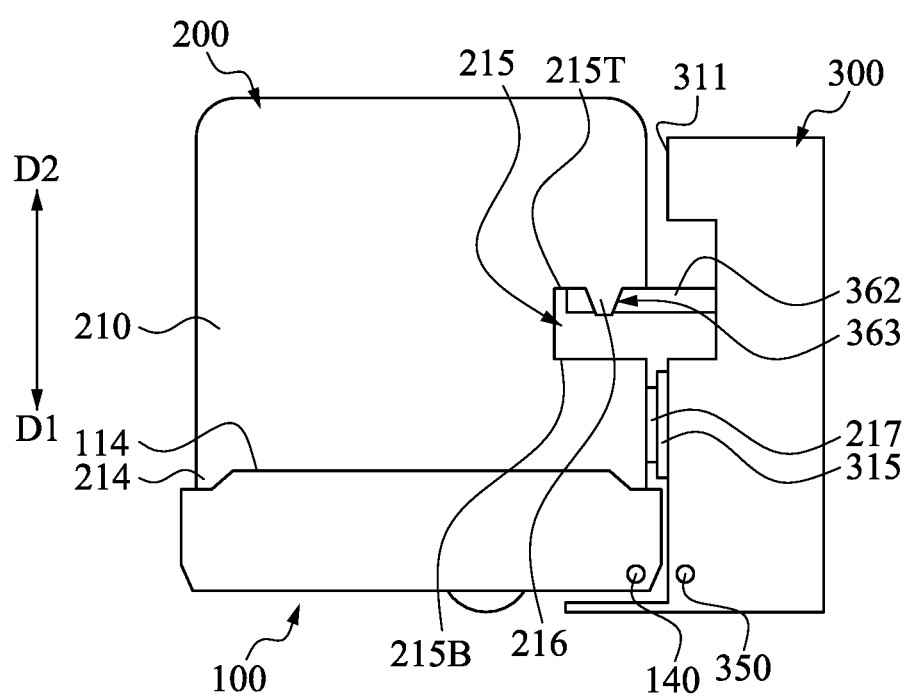

FIG. 5A-FIG. 5C are continuous schematic views that the electronic device 200 of FIG. 1 is placed back to the mobile working machine 100 from the docking station 300. When the mobile working machine 100 without loading the electronic device 200 is coupled with the docking station 300, and the second sensing element 350 is sensed by the first sensing element 140, the second control element 330 therefore drives the transferring device 360 to carry the electronic device 200 downwardly in the direction D1 onto the mobile working machine, in which the electronic device 200 is fixedly coupled on the mobile working machine 100, and the second contacts 132 of the mobile working machine 100 are respectively connected to the third contacts 221 of the electronic device 200 (FIG. 2). That is, the air gap G between the electronic device 200 and the mobile working machine 100 is vanished. More particularly, through the guidance of the guiding inner wall 313, the mobile working machine 100 is able to correctly and rapidly move to another correct position in which the cantilever arm 362 can be placed for being ready to lower the electronic device 200 back onto the mobile working machine 100. Thereby, increasing the success rate of successfully lowering the electronic device 200 onto the mobile working machine 100.

As shown in FIG. 4A, when the cantilever arm 362 is driven to lower onto the bottom inner surface 215B within the recess 215 along the direction D1, the positioning post 216 is detached from the positioning opening 363 exactly. Thus, since the electronic device 200 is fixedly coupled on the mobile working machine 100, and the electronic device 200 is no longer physically interfered by the cantilever arm 362, the mobile working machine 100 loading the electronic device 200 is able to leave the docking station 300 collectively.

Figure 6:
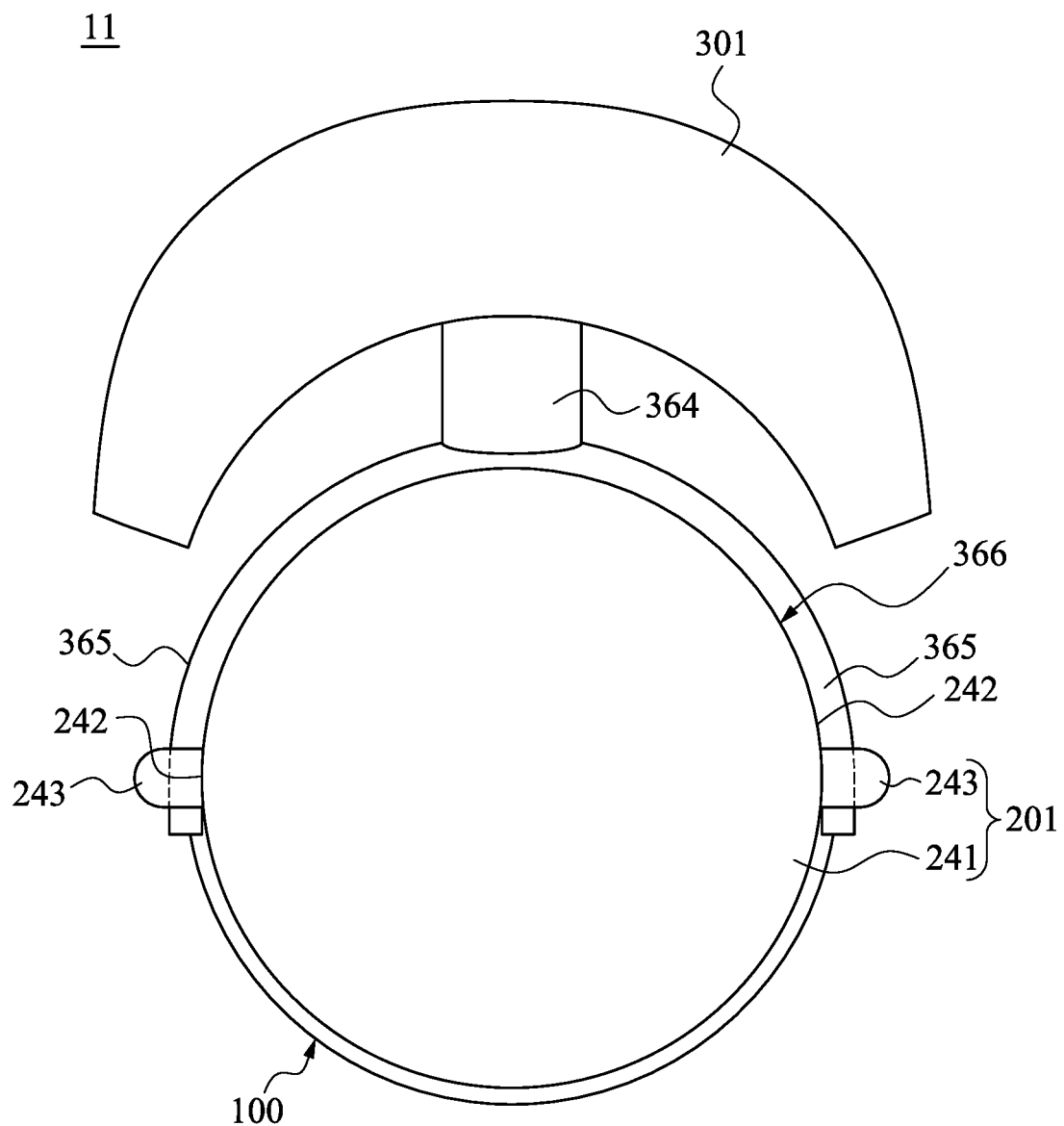
FIG. 6 is a top view of an electronic device being lifted up by a docking station of a robotic system according to one embodiment of the disclosure.

FIG. 6 is a top view of an electronic device 201 being lifted up by a docking station 301 of a robotic system 11 according to one embodiment of the disclosure. As shown in FIG. 6, the robotic system 11 of FIG. 6 and the robotic system 10 of FIG. 1 are substantially the same, however, at least some differences of the robotic system 11 of FIG. 6 from the robotic system 10 of FIG. 1 are that, the transferring device 360 includes a fork unit 364 having two cantilever arms 365, rather than single one cantilever arm 362 shown in FIG. 1, and the fork unit 364 and the cantilever arms 365 collectively define an accommodation space 366, and the casing 240 is formed with a housing 241 and two protruding wings 243 rather an the recess 215 of FIG. 1. The protruding wings 243 are respectively disposed on two opposite sides 242 of the housing 241. When the mobile working machine 100 loading the electronic device 201 is coupled to the docking station 301, the cantilever arms 365 of the fork unit 364 respectively extend to the opposite sides 242 of the housing 241, and the below of the protruding wings 243, respectively, so that the housing 241 is received within the accommodation space 366; next, the transmission module 361 drives the cantilever arms 365 to rise and push the protruding wings 243 upwardly, so as to lift the electronic device 201 away from the mobile working machine 100.

In the embodiments described above, the mobile working machine 100 can be a vacuum sweeping machine. The bottom surface 112 of the machine body 110 is formed with a suction opening 115, and the suction opening 115 is disposed between the wheels 151. However, the disclosure is not limited to the type of mobile work machine. For example, in other embodiments, the mobile work machine can also be a mopping machine or a security patrol machine.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A robotic system, comprising:
a mobile working machine comprising a machine body and a transmission wheel device, and the transmission wheel device that is disposed on the machine body for loading and moving the machine body;
an electronic device detachably loaded on a top surface of the machine body of the mobile working machine, and electrically connected to the mobile working machine; and
a docking station comprising a station base, and a transferring device disposed on the station base for selectively carrying the electronic device away from the mobile working machine,
wherein the transferring device comprises at least one cantilever arm elevatably disposed on one side of the station base, and a transmission module connected to the at least one cantilever arm to collectively lift the at least one cantilever arm,
wherein when the mobile working machine loading the electronic device is coupled with the station base of the docking station, the at least one cantilever arm is able to lift the electronic device upwardly from the mobile working machine, so that the electronic device and the mobile working machine are completely separated to each other.

2. The robotic system of claim 1, wherein the electronic device comprises a casing and an electronic module, the electronic module is disposed within the casing, and one side of the casing is formed with a recess,
wherein, when the at least one cantilever arm extends into the recess, the transferring device drives the at least one cantilever arm to push the electronic device upwardly within the recess.

3. The robotic system of claim 2, wherein the casing is provided with a positioning post that is disposed within the recess, and connected to an inner surface of the recess, and one surface of the at least one cantilever arm is formed with a positioning opening,
wherein, when the at least one cantilever arm pushes the electronic device upwardly within the recess, the positioning post is matchingly engaged within the positioning opening.

4. The robotic system of claim 2, wherein the one side of the casing is provided with a first resisting portion, the one side of the station base is provided with a second resisting portion, wherein, when the transferring device lifts the electronic device upwardly from the mobile working machine, the first resisting portion is slidably abutted against the second resisting portion,
wherein the first resisting portion is a planar surface, a convex arc surface or a rotation wheel.

5. The robotic system of claim 1, wherein the electronic device comprises a casing and an electronic module, the electronic module is disposed within the casing, and the casing is provided with two protruding wings, the two protruding wings are respectively disposed on two opposite sides of the casing, and the at least one cantilever arm branches off into two cantilever arms, and the transferring device comprises a fork unit having the two cantilever arms, wherein, when the two cantilever arms move to the below of the two protruding wings, respectively, the transferring device drives the two cantilever arms to push the electronic device upwardly.

6. The robotic system of claim 1, wherein the station base is formed with a concave portion, the concave portion is formed with a guiding inner wall, the guiding inner wall is configured to guide the mobile working machine to correctly move such that the at least one cantilever arm is in a position ready to lift the electronic device up.

7. The robotic system of claim 6, wherein the mobile working machine further comprises two rotation wheels, the two rotation wheels are arranged oppositely on the machine body, and configured to directly roll on the guiding inner wall, respectively.

8. The robotic system of claim 1, wherein the mobile working machine comprises a first control element and a first sensing element, the first control element is electrically connected to the first sensing element and the transmission wheel device; and the docking station comprises a second control element and a second sensing element, the second control element is electrically connected to the transferring device and the second sensing element, wherein, when the mobile working machine loading the electronic device is coupled with the docking station, and the second sensing element is sensed by the first sensing element, the second control element drives the transferring device to carry the electronic device away from the mobile working machine, when the mobile working machine without loading the electronic device is coupled with the docking station, and the second sensing element is sensed by the first sensing element, the second control element drives the transferring device to carry the electronic device back onto the mobile working machine.

9. The robotic system of claim 1, wherein the electronic device is a smart home device, a multimedia player, a security monitoring device, a smart secretary device or an air cleaner.

* * * * *